United States Patent [19]

Webster

[11] 4,413,018

[45] Nov. 1, 1983

[54] METHOD FOR PREPARING WHOLE GRAIN OAT PRODUCT

[75] Inventor: Francis Webster, Crystal Lake, Ill.

[73] Assignee: The Quaker Oats Company, Chicago, Ill.

[21] Appl. No.: 268,927

[22] Filed: Jun. 1, 1981

[51] Int. Cl.³ .......................... A23B 9/00; A23L 1/172
[52] U.S. Cl. ..................................... 426/618; 426/462; 426/466; 426/467; 426/619
[58] Field of Search ............... 426/615, 618, 443, 467, 426/460, 461, 462, 466

[56] References Cited

U.S. PATENT DOCUMENTS

| | | | |
|---|---|---|---|
| 115,947 | 7/1871 | Fitts | 426/618 |
| 117,165 | 7/1871 | Fitts | 426/618 |
| 128,342 | 6/1872 | Waitt | 426/618 |
| 2,930,697 | 3/1960 | Miller | 426/462 |
| 3,457,084 | 7/1969 | Weiss | 426/462 |

OTHER PUBLICATIONS

Ward, A., *The Encyclopedia of Food,* ©1923, pp. 239, 240 & 243.
Beeton, I., *The Book of Household Management,* ©1869, p. 940.
Tighe et al., *Woman's Day Encyclopedia of Cookery,* vol. 5, ©1966, p. 827.

*Primary Examiner*—Raymond N. Jones
*Assistant Examiner*—Elizabeth J. Curtin
*Attorney, Agent, or Firm*—Gerald T. Shekleton; Karen E. Ayd; Joseph P. O'Halloran

[57] ABSTRACT

A method of processing oat groats for imparting shelf stability to the groats by inactivating the enzymes of the groat without causing oxidation. By the subject invention the enzymes of the dehulled oats are deactivated by steaming, boiling or toasting. The boiled and steamed groats are then dried at a temperature and for a length of time sufficient that will not cause oxidation. The resulting toasted groats have increased shelf stability with good organoleptic attributes and may be prepared for consumption by boiling in water.

7 Claims, 1 Drawing Figure

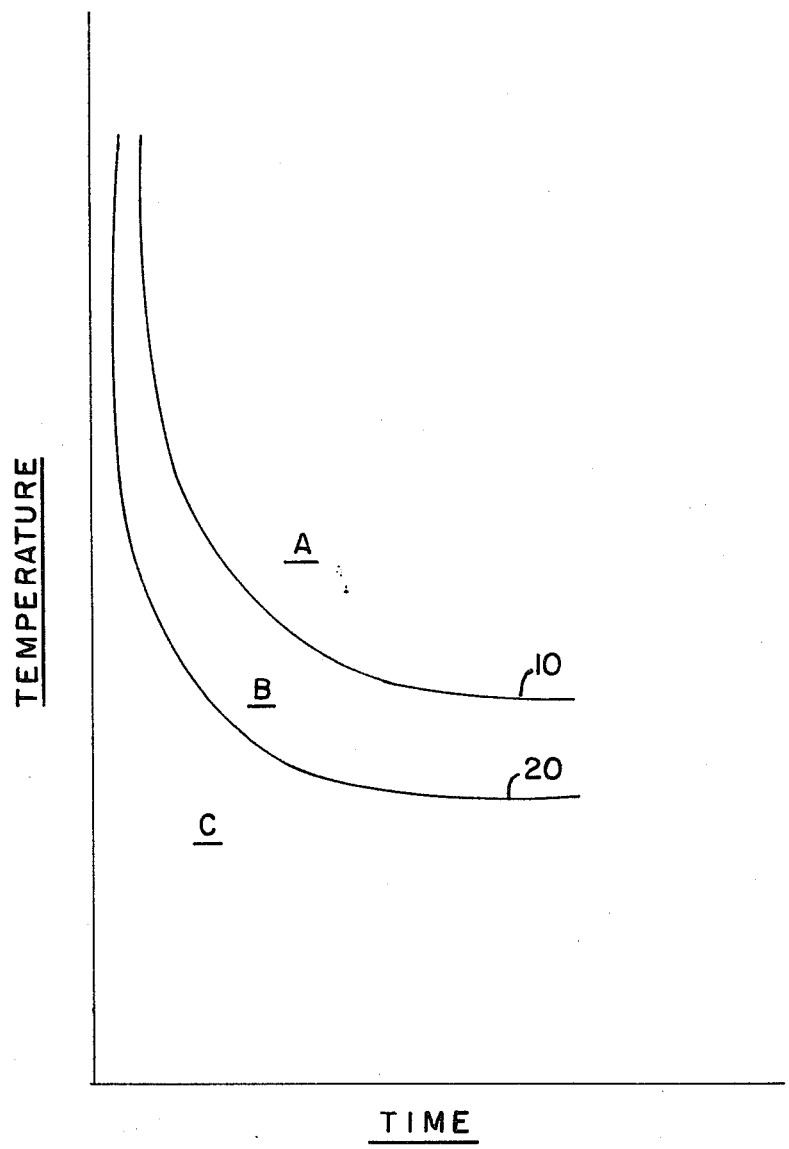

METHOD FOR PREPARING WHOLE GRAIN OAT PRODUCT

TECHNICAL FIELD

This invention relates to a method of preparing grain cereal products and more particularly to a method of preparing whole grain oat products for human consumption.

BACKGROUND OF THE INVENTION

Natural cereal products have in recent years achieved a high degree of consumer acceptance, and in some cereal products employ whole grain particles as the basic or sole ingredient. In the evaluation of any cereal grain product, whether whole grain, milled, or flaked, several factors must be considered iin evaluating the end consumer product. These factors in large part relate to the sensory qualities required of food commodities in the market place and include considerations regarding shelf stability, organoleptic attributes and consumer convenience. Consumer convenience primarily includes ease of preparation of the final food product, while the organoleptic attributes of the food product include its appearance, aroma, flavor and texture in both the final ready-to-eat form and the unprepared form, that is, the form in which the consumer receives the product.

Shelf stability involves the capability of the product, as presented to the consumer, to remain in a desirably consumable form or ready to prepare during the period of time required for delivery to the consumer and sufficient time thereafter until consumption. In the case of grain products, shelf stability is reliant chiefly upon the suppression of enzymatic and oxidative reactions which may occur within the grain. When such reactions are allowed to go forward, the grain becomes rancid. In particular, enzyme or lipid levels are more prominent in oat grains than other grains. Enzymatic reactions, particularly lipolytic reactions, occur relatively slowly at low moisture levels and temperatures and, unless inactivated or removed, can cause rancidity by the production of high levels of free fatty acids which can subsequently break down into peroxides. All samples of raw undamaged oat kernels, as harvested, contain 3–10% of their fat already in the form of free fatty acids (FFA). In the normal storage of unmilled raw oats, e.g., at 13% moisture content and 18° C., FFA levels increase slowly. If the oats are crushed, production of FFA can increase dramatically. The rate of such increase is generally accelerated by high moisture content and higher temperatures. The development of a high level of lipase activity in this manner, though not significant in a nutritional or healthful context, can render oat grain unsuitable for human consumption, though such rancid grain may be fed to animals.

Oat grain has been found to have its own antioxidant properties which can provide limited protection for the grain under some conditions. In fact, oat flour itself has been used as an antioxidant under the trademark "Avenex" for extending the shelf life of food products by treating with "Avenex" or wrapping the product in paper so treated. In spite of such natural antioxidant properties, rancidity of oats attributable to oxidation can occur under conditions of high heat and low moisture, and may be typified by an increase in free fatty acids as well as subsequent high peroxide levels. The occurrance of both enzymatic and oxidative rancidity of oats can be observed through a deterioration of the organoleptic attributes, most notably in the aroma and flavor of the grain.

The preparation of a whole grain product encounters significantly greater problems in reaching the necessary shelf stability when compared with the identical grain product in cut or flake form. In the whole grain form, efficient heat treatment of the grain is more difficult to achieve than that of cut or flaked grain products, which have a much higher surface area per grain particle and can reach a desired temperature quicker and more consistently on the application of a given amount of heat. In addition the moisture content of the cut or flaked grain may be released more easily. Thus, it is possible to use lower temperatures for longer periods of time to inactivate the enzymes within cut or rolled grain particles. Because the lower temperatures may be used, there is little or no danger of oxidation and yet the enzymes can be completely inactivated. In rolled grain products, such as rolled oats, the exterior bran layer is cracked and the kernel exposed; the moisture content of the grain is thus more easily controlled and the grain can be more uniformly heated. However, the whole grain oat with its bran layer intact retains its moisture longer on heating, thereby keeping the interior temperature of the grain significantly lower than its exterior temperature for longer periods of time. Thus higher exterior temperatures are required to inactivate the enzymes and for the desired drying effect to occur. With such higher temperatures comes an increased probability that oxidation will occur and promote rancidity, though the enzymes may be completely inactivated.

SUMMARY OF THE INVENTION

Therefore, an object of the subject invention is a packaged whole grain oat product which may be prepared in a convenient manner by the consumer.

Another object of the subject invention is a whole grain oat product having sufficient shelf stability resulting from enzyme inactivation and oxidative stability with reduced tendencies to become rancid.

A still further object of the subject invention is a whole grain oat product having the long lasting and desirable organoleptic attributes of good appearance, aroma and texture.

Still another object of the subject invention is a whole grain oat product prepared for consumer use through the simple addition of hot or boiling water and cooking for a minimum length of time.

These and other objects are provided by the process of the subject invention in which oat groats are heated under relatively mild conditions and gently dried. The heat applied in the subject inventive process is sufficiently intense for a sufficient length of time to completely inactivate the enzymes, yet not of such high temperatures for a time as to cause the oxidative reaction process to go forward. Either green oats groats or groats which have been conditioned at approximately 170°–210° F. heat for one to two hours may be subjected to wet heat, such as steam or by boiling in water, for 5–20 minutes, followed by drying, such as at approximately 250° F. for 10 to 20 minutes. In the alternative the conditioned groat may be heated at a temperature high enough to quickly deactivate the enzymes without causing oxidation, such as 425° F. for 30 seconds. The resulting processed whole grain groats are packaged for shelf display where they are capable of a long shelf life and may be prepared for consumption from the package by boiling with water and thereafter decanting to produce a whole grain dish having no astringent aftertaste with a very desirable texture, being chewy yet not hard.

DETAILED DESCRIPTION OF THE INVENTION

Whole grain oat products for consumption alone or with other food stuffs may be prepared in accordance with the subject invention. As stated above, oat grains have traditionally been difficult to prepare in the whole grain form, having the highest lipid level (3-11%) and highest enzyme level of all the grains, therefore being more subject to rancidity caused by enzyme activity. As a result of this greater enzymatic activity and lipid level a correspondingly greater problem in processing the oats to avoid the onset of rancidity is presented. Shelf stability, as perceived through degradation in the grain's organoleptic attributes, can decrease in inverse proportion to the level of residual enzymatic activity. It therefore becomes desirable to decrease the level of enzymatic activity to observe an increase in shelf stability.

In accordance with the subject invention it has been found that whole grain oats may be stabilized by a mild heat treatment which inactivates the enzyme content of an oat grain without causing oxidation of the groat. The results are accomplished in the process of the subject invention which in one embodiment involves elevating the water content of the oat groat to a moisture level in the range of 12-25% by tempering the groat through steaming or boiling in water. The tempered groat is then subjected to temperatures of approximately 250° F. for about 10-20 minutes, which is sufficient to reduce the water level to approximately 5-8%, yet insufficient to cause oxidation of the groat. More specifically, in this embodiment of the subject invention, the dehulled but uncut green oat groat is first conditioned by indirect steam heat to reduce the moisture level of the groat to approximately 7-8%. This may be accomplished by progressively raising the temperature in a vertical oven or dryer in progressive steps from 170°-220° F. over a period of one to two hours and then cooling slowly. After conditioning, the groat is tempered by steaming or, alternatively, placing in boiling water, for 5-20 minutes bringing it to a moisture content of approximately 20-35%. The oat groat is then dried and toasted in a heating cycle sufficient to reduce the moisture level of the groat to approximately 5-8%, yet insufficient to cause oxidation of the groat, as perceived through the resulting decreased organoleptic qualities of the groat.

Lipase activity and thus, enzymatic stability may be measured through free fatty acid (FFA) determination as follows: A portion of the grain under consideration is ground and 10% liquid corn oil is added to provide excess substrate for residual lipolytic enzymes. The mixture is stored at 100% humidity in sealed glass jars, from which samples are removed at intervals for FFA determination. The sample grain is reduced to flour and continuously extracted with petroleum ether overnight. The ether is evaporated to dryness, the residue resolvated in isopropyl alcohol, and titrated with KOH in isopropyl alcohol. The results are expressed in oleic acid equivalents and are given as percentage free fatty acid in the extracted oil.

Oxidative rancidity of the oat groats can be indicated through the presence or absence of peroxides in the groat. A high content of peroxides in a groat can give an approximate quantitative assessment of the oxidative rancidity of the groat. The determination of the peroxide content of oat groats can be made by dissolving an aliquot of an ether solution extracted from the groats in a mixture of acetic acid and chloroform, adding potassium iodide, and titrating with sodium thiosulfate. The resulting milliequivalent value is divided into the fat content of the aliquot to obtain milliequivalents of peroxide per 1000 g. of fat in the groat.

The following tables illustrate the principles previously discussed. For instance, Table I contains data showing that treating the groats by boiling or steaming will substantially inactivate the lipase content of the groats, while no such treatment results in an increase in free fatty acids on storage at 100° F.

TABLE I

Effect of Storage Time at 100° F. Upon the Lipase Activity of Heat Processed Oat Groats[A]

| Process | Process Time Minutes | % Free Fatty Acid[B] | | | |
|---|---|---|---|---|---|
| | | 0 Days | 7 Days | 13 Days | 22 Days |
| None | — | 2.8 | 12.8 | 19.9 | 19.3 |
| Boil[C] | 5 | 1.5 | 1.8 | 1.8 | 3.7 |
| Boil[C] | 15 | 1.2 | 1.2 | 1.4 | 1.4 |
| Boil[D] | 1 | | | | |
| Boil[D] | 5 | | | | |
| Boil[D] | 10 | | | | |
| Boil[D] | 20 | | | | |
| Steam 5 psig[C] | 10 | 1.5 | 1.6 | 1.6 | 1.6 |
| Steam 5 psig[C] | 30 | 1.4 | 1.3 | 1.7 | 1.4 |

[A]All samples adjusted to 10% moisture prior to initiation of Lipase testing
[B]Grams Free Fatty Acid per 100 grams fat
[C]Dried 50° C. Vacuum
[D]Air dry Table II demonstrates that the lipolytic activity of the groats is also very low after an additional step of drying by forced streams of hot air (termed "jet drying") at 250° F. for 600 seconds.

TABLE II

Effect of Storage Time at 100° F. Upon the Lipase Activity of Processed Oat Groats

| Pre Jet Drier Process | Time at 100° F. | Jet Drier Temp °F.[D] | Free Fatty Acid[A] | | | | | |
|---|---|---|---|---|---|---|---|---|
| | | | 0 | 8 | 10 | 15 | 18 | 23 Days |
| No Process-Control[B] | 0 | — | 3.1 | 17.7 | — | 24.2 | — | 32.0 |
| Boiling Tap Water | 1 | 250 | 2.4 | 2.8 | — | 2.9 | — | 2.8 |
| Boiling Tap Water | 5 | 250 | 2.7 | 2.5 | — | 2.4 | — | 2.4 |
| Boiling Tap Water | 10 | 250 | 1.8 | — | 2.0 | — | 2.1 | — |
| Boiling Tap Water | 15 | 250 | 1.6 | — | 1.7 | — | 1.7 | — |
| Boiling Deionized Water | 1 | 250 | 2.5 | — | 2.9 | — | 2.9 | — |
| Boiling Deionized Water | 5 | 250 | 2.1 | 2.5 | — | 2.5 | — | 2.5 |
| Boiling Deionized Water | 10 | 250 | 1.8 | 2.1 | — | 2.4 | — | 3.6 |
| Boiling Deionized Water | 15 | 250 | 1.6 | 2.0 | — | 2.3 | — | 2.0 |
| No Process-Control | — | — | 3.4 | — | 19.3 | — | 30.4 | — |
| Steaming[C] | 5 | 200 | | | | | | |
| Steaming[C] | 10 | 250 | 2.6 | — | 3.1 | — | 2.7 | — |

TABLE II-continued

Effect of Storage Time at 100° F. Upon the Lipase Activity of Processed Oat Groats

| Pre Jet Drier Process | Time at 100° F. | Jet Drier Temp °F.[D] | Free Fatty Acid[A] | | | | | |
|---|---|---|---|---|---|---|---|---|
| | | | 0 | 8 | 10 | 15 | 18 | 23 Days |
| Steaming[C] | 20 | 250 | 2.3 | — | 2.4 | — | 2.4 | — |
| Steaming[E] | 10 | (F) | 2.2 | 2.9 | — | 3.4 | — | 3.1 |
| Steaming[E] | 20 | (F) | 2.5 | 2.8 | — | 3.0 | — | 2.6 |
| Steaming[E] | 30 | (F) | 2.4 | 2.8 | — | 3.0 | — | 2.8 |

[A]Grams free fatty acid per 100 g fat
[B]No Jet Drier treatment
[C]Atmospheric Pressure
[D]Process time 600 seconds
[E]Moisture adjusted to 13% by adding deionized water
[F]Dried overnight in a 45° C. vacuum oven Table III shows that without the boiling or steaming step, the inactivation of the enzymes requires appreciably higher temperatures in the jet drier, yet can still be accomplished.

TABLE III

Effect of Storage Time at 100° F. Upon the Lipase Activity of Jet Drier Process Oat Groats

| Jet Drier Process | | Moisture % | | Free Fatty Acids[A] | | | | | | |
|---|---|---|---|---|---|---|---|---|---|---|
| Temp °F. | Seconds | Initial | Final | 0 | 6 | 8 | 13 | 14 | 19 | 27 Days |
| None-Control | | ≈6% | | 2.6 | 5.8 | | 8.9 | | 10.8 | 13.4 |
| 425 | 30 | 13.93 | 9.44 | 2.5 | 6.7 | | 10.9 | | 11.6 | 19.7 |
| | 30 | 15.57 | ≈10.5 | 2.6 | | 7.3 | | 9.3 | | |
| | 30 | 20.60 | ≈10.5 | 2.8 | | 6.3 | | 7.2 | | |
| | 45 | 13.93 | 8.02 | 2.4 | 3.1 | | 3.4 | | 4.0 | 4.2 |
| | 45 | 15.57 | ≈10.5 | 2.5 | | 3.8 | 4.8 | | | |
| | 45 | 20.60 | 10.5 | 2.4 | | 4.1 | 5.2 | | | |
| | 60 | 13.93 | 6.77 | 2.5 | 2.6 | | 2.7 | | 2.9 | 3.3 |
| | 60 | 24.23 | 10.53 | 2.3 | 4.0 | | 4.7 | | 5.4 | 6.0 |
| | 60 | 15.57 | ≈10.5 | 2.4 | | 4.4 | | | 6.0 | |
| | 60 | 20.60 | ≈10.5 | 2.3 | | 3.2 | | 3.4 | | |
| 475 | 60 | 13.93 | 5.58 | 2.1 | 2.2 | | 2.2 | | 2.4 | 2.3 |

[A]Grams Free Fatty Acid per 100 Grams Fat

Regardless of the FFA content of the oat groats, the peroxide level of the groats, with the exception of the subjective organoleptic determinations, remains the single most important objective indicator of oxidative rancidity. Table IV illustrates the fact that if the groats are boiled for too long, or if the conditions are too severe, as with autoclaving, the groats become rancid.

TABLE IV

Effect of Storage Time at 100° F. Upon the Peroxide Value of Freeze Dried Oat Groats

| Heat Process | Time Min. | Peroxide Values[A] | | |
|---|---|---|---|---|
| | | 0 Days | 6 Days | 11 Days |
| Boil[B,E] | 30 | 0 | 3.0 | 5.9 |
| Boil[B] | 30 | 7.2 | 36.5 | 73.3 |
| Autoclave at 121° C. 25 psi[C] | 15 | 12.3 | 32.0 | 56.6 |
| Autoclave at 121° C. 25 psi[C] | 15 | 8.0 | 22.7 | 28.3 |
| Autoclave at 121° C. 25 psi[C] | 15 | 13.2 | 22.5 | 36.0 |
| Autoclave at 121° C. 25psi[C] | 15 | 11.5 | 31.6 | 38.2 |
| Autoclave at 121° C. 25 psi[C] | 20 | 25.1 | 34.7 | 36.0 |
| Autoclave at 121° C. 25 psi[C] | 20 | 15.0 | 42.7 | 29.6 |
| Autoclave at 121° C. 25 psi[C] | 25 | 24.3 | 20.9 | 39.1 |
| Autoclave at 121° C. 25 psi[C] | 25 | 20.1 | 25.0 | 34.2 |
| Steam[D] | 10 | 0 | 0 | 0 |
| Steam[D] | 20 | 0 | 0 | 0 |
| Steam[D] | 30 | 0 | 0 | 0 |
| Control - None | 0 | 0 | 0 | 0 |

[A]Milliequivalents per 1000 grams
[B]Samples were freeze dried after boiling
[C]Samples air dried at room temperature after steaming
[D]Dried overnight in 45° C. vacuum oven
[E]Pre-soak 30 min. in water In one embodiment of the invention the enzymatic activity of the groat is reduced substantially by boiling in water. The enzymatically stable groats are then dried by a jet drier which shoots jets of air heated to the desired temperature into a mass of moist groats thereby agitating the groats with hot air to quickly and uniformly heat the groats to the desired temperature. The time and temperature to which the oat groats are subjected in the jet drier becomes extremely crucial, as can be seen in Table V. Treatment of the groats at 200° F. or 250° F. after steaming for 10 minutes in accordance with the subject invention does not produce any oxidative rancidity, as is indicative from the peroxide valves found. However, treatment of the groats at 300° F. after steaming for the same period of time produces oxidative rancidity within a short period of time, thereby rendering the higher temperature treatment unsatisfactory.

TABLE V

Effect of Storage Time at 100° F. Upon the Peroxide Value of Processed Oat Groats

| Treatment | Time (Mins.) | Jet Drier Temp. (°F.) | Time (Sec.) | Peroxide Value[B] (Days) | | | | | | | |
|---|---|---|---|---|---|---|---|---|---|---|---|
| | | | | 0 | 6 | 7 | 13 | 17 | 21 | 28 | 42 |
| Steam | 10 | 250 | 600 | 0 | | 0 | | 0 | | | |
| " | 20 | 250 | 600 | 0 | | 0 | | 0 | | | |
| " | 10 | 200 | 600 | 0 | | 0 | | 0 | | | |
| " | 10 | 250 | 600 | 0 | | 0 | | 0 | | | |
| " | 10 | 300 | 600 | 0 | | 7.6 | | 7.0 | | | |
| " | 10 | 250 | 600 | 0 | | 2.3 | 0 | | 0 | 0 | 0 |
| " | 10 | 250 | 1200 | 0 | | 0 | 0 | | 0 | 0 | 0 |
| " | 10 | 300 | 600 | 5.0 | | 11.1 | 29.8 | | 4.6 | 11.8 | 5.2 |
| " | 10 | — | — | 0 | | 2.0 | 0 | | 0 | 0 | 0 |
| Boil | 5 | 250 | 600 | 0 | | 2.0 | 0 | | 0 | 0 | 0 |
| " | 5 | 250 | 1200 | 0 | | 0 | 0 | | 0 | 0 | 0 |
| " | 5 | 300 | 600 | 23.0 | | 32.5 | 49.6 | | 31.1 | 36.8 | 26.5 |
| No Process - Control | — | — | — | 0 | | 2.1 | 0 | | 0 | 0 | 0 |
| Autoclaved | 30 | 175 | 600 | 15.0 | 26.8 | | | | | | |
| " | 30 | 200 | 600 | 29.0 | 46.3 | | | | | | |
| " | 30 | 225 | 600 | 21.0 | 40.7 | | | | | | |
| " | 30 | (C) | — | 23.2 | 34.2 | | | | | | |
| " | 30 | 175 | 600 | 18.2 | 29.0 | | | | | | |
| " | 30 | 200 | 600 | 26.7 | 46.6 | | | | | | |
| " | 30 | 225 | 600 | 18.0 | 38.2 | | | | | | |

[A]Atmospheric Pressure
[B]Milliequivalents per 1000 grams fat.
[C]Air dried by heat gun at 50° C.

It is important to recognize that the groats must be heated at a sufficient temperature for a sufficient length of time for the enzymes within the groat to be inactivated. For instance, as shown in Table VI, heating at 425° F. for 45 seconds is sufficient to deactivate the enzymes, as indicated by the low FFA levels. However, heating the groats at a temperature of 425° F. for 15 seconds longer, i.e. for 60 seconds, is sufficient to cause oxidative rancidity as is evident from the increases in peroxide level in the sample after a period of time. Conversely, if the groats are heated at too high a temperature for too long, oxidative stability results. For example, in Table VI, heating the groats at 375° F. for 60 seconds shows no peroxide existence after fourteen days, but heating the groats at 375° F. for 90 seconds is sufficient to cause oxidative instability, with evidence of peroxides appearing after a short time.

TABLE VI

Effect of Storage Time at 100° F. upon the Peroxide Value of Jet Drier Processed Oats

| Heat Treatment | | Moisture % | | Peroxide Value[A] | | | |
|---|---|---|---|---|---|---|---|
| Temp. °F. | Seconds | Initial | Final | 0 | 7 | 8 | 14 | 15 |
| 250 | 300 | 15.57 | 8.86 | 0 | | 0 | | 0 |
| 275 | 60 | 13 | 9.36 | 0 | 0 | | 0 | |
| | 120 | 13 | 7.85 | 0 | 0 | | 0 | |
| | 180 | 13 | 6.84 | 0 | 0 | | 0 | |
| | 240 | 13 | 6.23 | 0 | 0 | | 0 | |
| | 300 | 13 | 5.75 | 0 | 0 | | 0 | |
| 325 | 60 | 13 | 8.41 | 0 | 0 | | 0 | |
| | 90 | 13 | 7.42 | 0 | 0 | | 0 | |
| | 120 | 13 | 6.21 | 0 | 0 | | 0 | |
| 325 | 180 | 15.57 | 6.54 | 0 | | 0 | | 0 |
| | 200 | 13 | 4.23 | 0 | 0 | | 0 | |
| | 300 | 13 | 2.45 | 0 | 0 | | 2.9 | |
| 375 | 30 | 11.75 | 9.09 | | | 0 | | 0 |
| | 45 | | 9.90 | | | 0 | | 0 |
| | 60 | | 8.43 | | | 0 | | 0 |
| | 75 | | 7.29 | | | 0 | | 0 |
| | 90 | 13 | 4.66 | 0 | 9.8 | | 11.0 | |
| | 120 | 13 | 4.15 | 0 | 19.2 | | 24.01 | |
| | 180 | 13 | 2.53 | 0 | 65.2 | | 105.2 | |

TABLE VI-continued

Effect of Storage Time at 100° F. upon the Peroxide Value of Jet Drier Processed Oats

| Heat Treatment | | Moisture % | | Peroxide Value[A] | | | |
|---|---|---|---|---|---|---|---|
| Temp. °F. | Seconds | Initial | Final | 0 | 7 | 8 | 14 | 15 |
| 425 | 30 | 20.60 | 14.54 | 0 | | 0 | | 0 |
| | 45 | 15.57 | 8.93 | 0 | | 0 | | 0 |
| | 45 | 20.60 | 12.92 | 0 | | 0 | | 0 |
| | 60 | 15.57 | 7.66 | 0 | | 6.58 | | 9.0 |
| | 60 | | 6.65 | | | 3.38 | | 3.38 |
| | 75 | | 6.29 | | | 12.99 | | 12.88 |
| | 75 | | 5.24 | | | 12.15 | | 10.16 |
| 475 | 30 | 11.75 | 8.52 | | | 0 | | 0 |
| | 45 | | 6.96 | | | 5.82 | | 6.87 |
| | 60 | | 4.87 | | | 17.72 | | 18.31 |
| | 75 | | 3.64 | | | 27.60 | | 24.01 |

[A]Milliequivalents per 1000 grams fat.

Referring to FIG. 1, there is depicted a graph of the temperatures to which the groats may be subjected in the heat treatment of the subject invention versus the respective times for which the groats are exposed when subjecting them to the jet drying treatment. Line 10 of the graph represents an upper limit of temperature and time of treatment beyond which oxidative rancidity will occur during jet drying. This area of the graph is represented by the letter "A." Below line 20 is area "C" which represents oat groats heated to a temperature below that which is necessary to inactivate the enzymes of the groat. The resulting groats are not sufficiently toasted or heated and are unacceptable in terms of stability. Between lines 10 and 20 is area "B" which represents those oats which have been heated to a sufficient temperature for a sufficient length of time to toast the groats, that is, inactivate the enzymes, without causing any oxidation of the groats. The relative placement of lines 10 and 20 in defining Areas A, B and C also accurately represents the relationships in the oat groat status when the groats are are treated by boiling or steaming and subsequent drying.

The whole grain oat groats which have been treated in the above described manners, becoming enzymatically and oxidatively stable as a result, are then in a condition for packaging and storage subsequent to use by the consumer. Due to this stability of the whole grain oat groat after processing according to the subject invention, the groats may be packaged using conventional moisture-protective wrapping material, such as plastic bags or the like, and can be stored for extended periods of time without incurring any risk of rancidity. Thus the stable whole grain oats groats of the subject invention will retain their stability and flavor during transport to the store and while on the store shelf awaiting purchase, as well as for a reasonable length of time on the consumer's shelf at home.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method for preparing quick-cooking oats, in whole form, comprising the steps of:
    a. conditioning dehulled uncut, unrolled oats, by indirect steam heat at a temperature in the range approximately 170°–220° F. until the moisture level of the oats is approximately 7–8% based on the weight of the oats to yield conditioned oats, in whole form;
    b. tempering the conditioned oats by a method selected from the group consisting of steaming or boiling in water, to yield tempered oats, in whole form, having a moisture content in the range 12–35% by weight based on the weight of the oats; and
    c. drying and toasting the tempered oats at a temperature insufficient to oxidize the oat lipids but sufficient to reduce the moisture content of the oats to a moisture in the range 5–8% inclusive;

thereby producing a quick-cooking oat product in which the oats are in whole form.

2. The method of claim 1 wherein the conditioning step involves subjecting the whole form oats to heat by slowly increasing the temperature over a period 1–2 hours to a temperature in the range approximately 170°–200° F.

3. The method of claim 1 wherein the tempering step comprises subjecting the oats in whole form to steam at atmospheric pressure.

4. The method of claim 1 wherein the tempering comprises boiling said oats in whole form in water for less than 30 minutes.

5. The method of claim 1 wherein the drying comprises heating the oats to a temperature in the range 250° F.–425° F. for a time period between 30 and 45 seconds inclusive.

6. The method of claim 1 wherein the tempering comprises heating the oats in whole form to 425° F. for 30 second in an air fluidized bed.

7. A method for preparing a packaged dehydrated ambient temperature shelf stable oat product, wherein the oats are in whole form and wherein said dehydrated oat product may be rapidly reconstituted in boiling water, comprising the steps of:
    a. tempering uncut, dehulled, whole-form oats by subjecting the uncut, dehulled oats to moist heat at approximately 170°–220° F. for a time period sufficient to increase the moisture content of the oats to within the range of 12–35% by weight, based on the weight of the oats;
    b. drying and toasting the tempered oats by heating the oats to a temperature in the range 250° F.–425° F. for a time period of approximately 30–60 seconds sufficient to dehydrate said oats to a moisture content in the range 5–7% and to inactivate the enzyme content of the oats without initiating oxidation of the oats and without destroying the whole form of the oats; and
    c. placing the dried, toasted oats, in whole form, in a moisture protective package.

* * * * *